United States Patent [19]

Yoshida

[11] Patent Number: 4,727,576
[45] Date of Patent: Feb. 23, 1988

[54] PICTURE IMAGE COMMUNICATION APPARATUS

[75] Inventor: Takehiro Yoshida, Tokyo, Japan

[73] Assignee: Canon Kabushiki Kaisha, Tokyo, Japan

[21] Appl. No.: 697,459

[22] Filed: Feb. 1, 1985

[30] Foreign Application Priority Data

Feb. 7, 1984 [JP] Japan ................. 59-19433

[51] Int. Cl.$^4$ ........................ H04M 11/08
[52] U.S. Cl. ........................ 379/100; 358/257
[58] Field of Search ........... 179/2 A, 2 DP, 2 R; 358/286, 257; 355/30; 379/100

[56] References Cited

U.S. PATENT DOCUMENTS

| 2,506,437 | 5/1950 | Watson | 179/2 R |
| 3,962,534 | 6/1976 | Ogawa | 179/2 DP |
| 4,149,196 | 4/1979 | Wada et al. | 358/286 |
| 4,297,727 | 10/1981 | Ogawa et al. | 358/286 |
| 4,353,097 | 10/1982 | Takeda et al. | 179/2 DP |
| 4,485,400 | 11/1984 | Lemelson et al. | 179/2 DP |
| 4,502,080 | 2/1985 | Tsuda | 358/286 |
| 4,506,111 | 3/1985 | Takenouchi et al. | 179/2 A |
| 4,567,322 | 1/1986 | Tsuda | 179/2 A |

Primary Examiner—James L. Dwyer
Attorney, Agent, or Firm—Fitzpatrick, Cella, Harper & Scinto

[57] ABSTRACT

A picture image communication apparatus has an original detection device for detecting a setting of an original; a manual switch for commanding the start of reading out a picture image of the original; a feed mechanism for feeding the original to a reading out position; and a control unit for driving the feed mechanism based upon a detection output from the original detection device without waiting for a turning on of the manual switch. The apparatus may be applied both in manual and automatic communications. In the former case, the presence or absence of an off-hook state of a telephone and the presence or absence of an original may be employed for the control conditions of the control unit to perform various operational modes.

9 Claims, 8 Drawing Figures

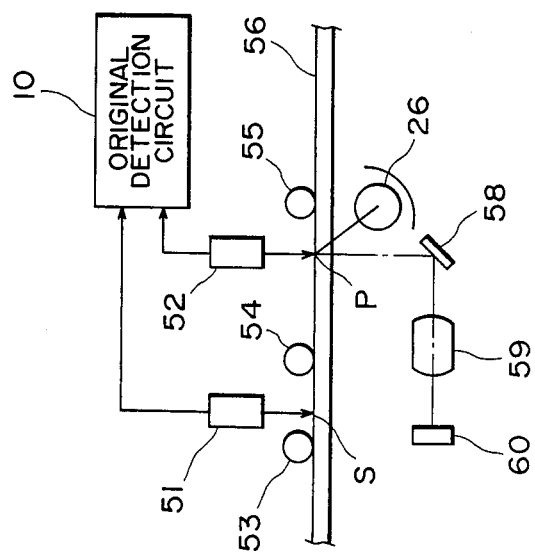

PICTURE IMAGE COMMUNICATION APPARATUS

BACKGROUND OF THE INVENTION

1. Field of the Invention

The present invention relates to a picture image communication apparatus.

2. Description of the Prior Art

Communication over a conventional facsimile system has been effected by first calling in a known manner a receiver by using a telephone annexed to the facsimile transmitter, and upon reception of a response from the receiver, transference of a picture image has been started by pushing a start button or the like. Until the transference starts with the depression of the start button, only the processes for the telephone are performed and facsimile operation does not start. Since the processes prior to the transference start only with the manipulation of the start button, for a mini-fax transference mode having short time preceding processings, such occasion has been brought about as the control for devices in the facsimile delays from the time when the short time preceding processings terminated.

For example, in the case of transference using a mini-fax mode 1, delivery of image signals can be initiated to start after the phase adjustment is completed. However, in practice, sufficient feeding of an original to an original reading out position or deficient illumination of a light source for reading out an original can not be attained, and therefore it is impossible to proceed immediately thereafter with the transference of a picture image.

SUMMARY OF THE INVENTION

The present invention has been made to solve the above prior art problems, and it is an object of the present invention to provide a picture image communication apparatus which cn start the delivery of image signals immediately after necessary preceding processes have been completed.

More in detail, it is an object of the present invention to provide a picture image communication apparatus having means for detecting the presence or absence of an original and a manual switch for commanding the start of transmitting a picture image, which, if an original is present, can start the preparation of transmitting without waiting for the actuation of the manual switch.

These objects are achieved according to the present invention by providing a picture image communication apparatus comprising means for detecting the setting of an original, a manual switch to start the reading out of an image of the original, and control means for controlling an operation of the apparatus based on a detection outout from the original detection means withoout awaiting the turning on of the manual switch. The processing may be the feeding of an original to a reading out position, or actuation of an illumination means. A means is preferably provided for detecting an off-hook state of a telephone with which the apparatus is provided. In this case, an output from the latter detection means also may be used by the control means to determine when the processing is to be initiated.

Other objects of the present invention will be apparent from the following detailed description and the accompanying drawings.

DETAILED DESCRIPTION OF THE PREFERRED EMBODIMENT

The present invention will now be described with reference to the accompanying drawings illustrating an embodiment of the invention. The main construction of a facsimile apparatus embodying the present invention is shown in FIG. 1.

Figure 1:
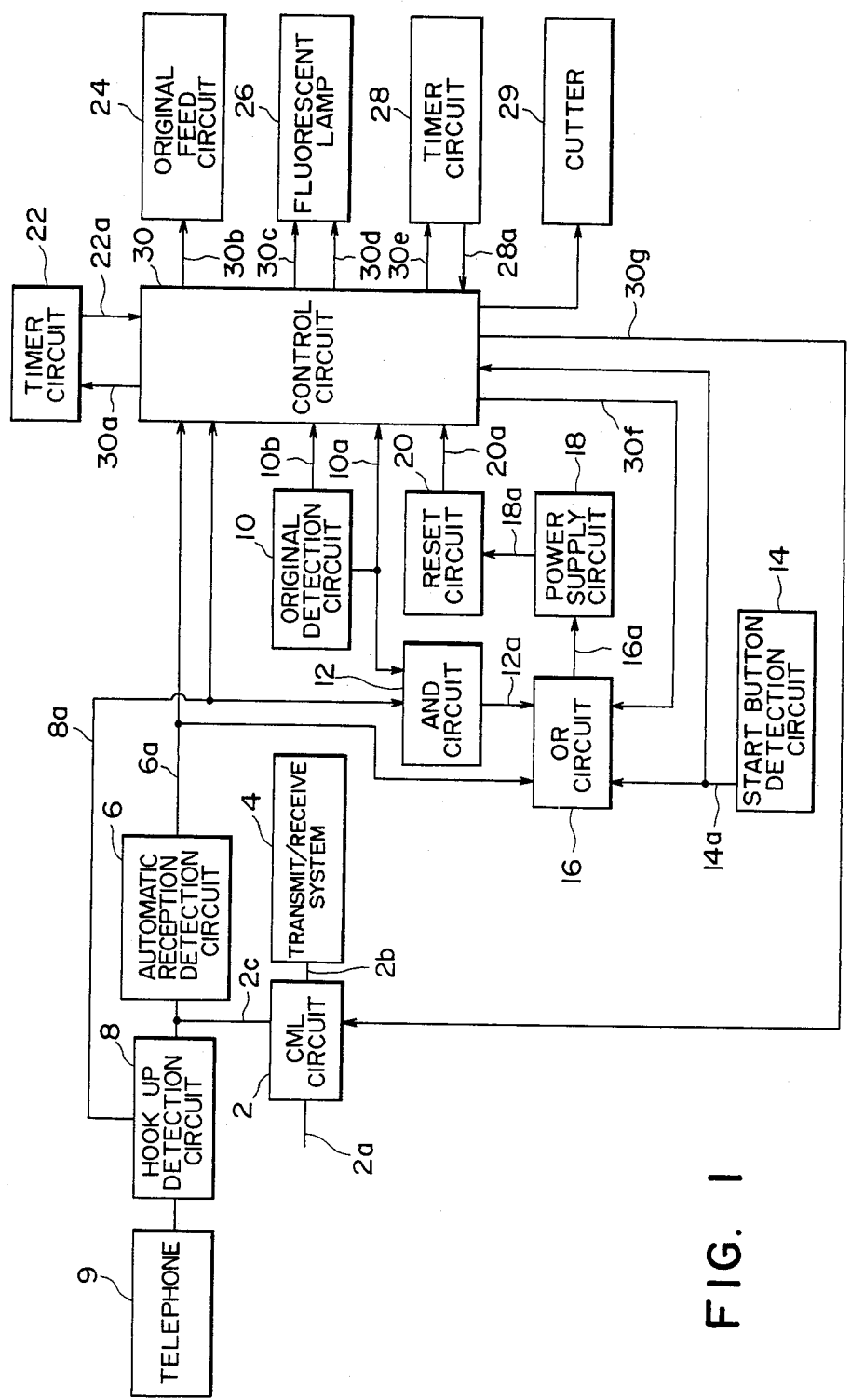
FIG. 1 is a block diagram showing the main construction of a facsimile apparatus according to the present invention.

Blocks represented by reference numbers 6, 8, 10, 12, 14 and 16 in FIG. 1 are devices of the kind that is always driven into operation using a stand-by power supply (not illustrated). Blocks represented by reference numbers 22, 24, 26, 28 and 30 are devices of the kind that is driven into operation when a main power supply is turned on.

In FIG. 1, represented by reference number 2 is a CML circuit which is controlled via a signal line $30g$ with a control circuit 30 described later. That is, while the signal line $30g$ is at a level "0", a telephone line $2a$ is connected to a signal line $2c$, and while the signal line $30g$ is at a level "1", the telephone line $2a$ is connected to a signal line $2b$. In addition, the CML circuit 2 is connected via the signal line $2b$ to the transmit/receive system 4 of a type used in known facsimile apparatus.

The transmit/receive system 4 of a known type comprises a modulator, picture image memory, picture image read-out device, recording device and the like. In the illustrated embodiment, the transmit/receive system 4 performs, other than picture image transmission and reception, at least two operations, one for outputting from the recording device a picture image read out of the picture image read-out device and the other for cutting a recorded paper into a sheet. These operations can be achieved using known technique, and a detailed description thereof is here omitted.

To the signal line $2c$, an automatic reception detection circuit 6 and a hook-up detection circuit 8 are connected. The automatic reception detection circuit 6 is of the known type in which an automatic reception operation is carried out by detecting a calling signal or the like. For the process of automatic reception a level "1" is output onto a signal line $6a$, and for other processes a level "0" is output.

The hook-up ("hook-up" is used in the specification solely as a convenient alternative designation of the off-hook state) detection circuit 8 is for detecting a known hook-up state and outputs a level "1" on a signal line $8a$ when the operator lifts up the receiver of a telephone 9. In other cases, the signal line $8a$ is turned into a level "0".

The output from the automatic reception detection circuit 6 is coupled to a control circuit 30, while the output from the off-hook detection circuit 8 is coupled to the control circuit 30 and an AND circuit 12.

Represented by reference number 10 is an original detection circuit which, in the illustrated embodiment, detects the presence or absence of an original at two positions on an original rest. An original detection circuit 10 as shown in FIG. 2 receives as an input a detection signal from a photo-interrupter 51 detecting the presence or absence of an original on a setting position S on which the original to be transmitted is set, and a detection signal from a photo-interrupter 52 detecting the presence or absence of the original at an original reading out position P. In FIG. 2, reference numbers 53, 54 and 55 denote original feed rollers, reference number 56 denotes a transparent original rest, reference number 26 denotes a fluorescent lamp for an original illuminating light source, reference number 58 denotes a mirror, reference number 60 denotes a solid image sensor for reading out such as a CCD. As described above, the detection circuit 10 detects an original at a position in front of the reading out position and remote therefrom by a preset distance, and at the reading out position. If an original is detected at the detection position S front of the reading out position, a level "1" is output on a signal line 10a, and if the original is detected at the reading out position P, a level "1" is output on a signal line 10b. In other cases, a level "0" is output on the signal lines 10a and 10b. The signal lines 10a and 10b are connected to the control circuit 30, and the line 10a is further connected to the AND circuit 12.

The AND circuit 12 is input with signals from the signal lines 8a and 10a, the conjunction of the two signals being output to an OR circuit 16 through a signal line 12a.

The OR circuit 16 is connected with the signal lines 6a and 12a, and further with an output signal line 14a of a start button detection circuit 14 and a control line 30f of the control circuit 30. The OR circuit 16 controls the power supply circuit 18 in accordance with the disjunction signal of the signals input to the OR circuit 16. The disjunction signal is delivered via a signal line 16a to the power supply circuit 18 which is driven into operation by a level "1" disjunction signal.

The start button detection circuit 14 is a known switch input circuit and detects the manipulation of a manual start button instructing the start of communications. Upon manipulation of the start button the signal line 14a is turned into a level "1", and in the other case the line 14a is turned into a level "0".

The power source circuit 18 is driven into operation by a level "1" of the signal line 16a. The supplying source voltage is for example 5 V. When the power supply is driven, its source voltage is delivered out throough not shown other lines as well as a line 18a which is connected to a reset circuit 20.

The reset circuit 20 retains a level "0" on a signal line 20a until the voltage on the signal line 18a reaches a nominal value of 5 V, and outputs a level "1" to the signal line 20a when the nominal value is gained, in order to reset the control circuit 30.

As appreciated from the above circuit arrangement, the turning on and its retaining operation of the main power supply circuit 18 is accomplished under the following four conditions: first, on condition that the two inputs of the AND circuit 12 are both at a level "1", that is, during the time while the level of the signal line 6a to the OR circuit 16 is turned to a level "1" by detecting the hook-up of the telephone 9 and the setting of an original, respectively wit the hook-up detection circuit 8 and the original detection circuit 10; second, during the time while the level of the signal line 6a to the OR circuit 16 is turned to a level "1" by detecting an automatic reception with the automatic reception detection circuit 6; third, during the time while the level of the signal line 14a is turned to a level "1" by detecting the manipulation of the start button with the start button detection circuit 14; and fourth, during the time while the level of the signal line 30f is turned to a level "1" under control of the control circuit 30 in order to retain the operation of the power supply circuit 18.

The control circuit 30 is connected with two timer circuits 22 and 28 for the controls described later. The timer circuit 22 generates pulses onto a signal line 22a one minute after the control circuit 30 generates pulses onto a signal line 30a, while the timer circuit 28 generates pulses onto a signal line 28a five seconds after the control circuit 30 generates pulses onto a signal line 30e. The five second duration is for a preparatory illumination time of the light source.

Devices under control of the control circuit 30 are shown as the fluorescent lamp 26 and an original feed circuit 24.

When pulses are generated onto a signal line 30b, the feed circuit 24 feeds with the feed rollers 53, 54 and 55 an original by a certain amount, e.g., by an amount corresponding to one line scan.

The fluorescent lamp 26 is controlled by way of signal lines 30c and 30d from the control circuit 30. While both signal lines are at a level "0", the fluorescent lamp 26 is not driven. While both signal lines 30c and 30d are respectively at levels "1" and "0", a preparatory illumination is performed, on the other hand, while both signal lines 30c and 30d are respectively at levels "0" and "1", a principal illumination is performed.

The control circuit 30 is constructed of a micro processor, associated memory circuits and the like. The controls under the control circuit 30 are briefly described hereinunder.

As previously described, the power supply circuit 18 is actuated to turn on under the conditions such as automatic reception, turning on of the start button, or setting of an original. Succeedingly, the reset circuit 20 makes the control circuit 30 start with its control.

In the case of automatic reception, the control circuit 30 performs an automatic reception control in the known manner.

If the start button has been turned on but the hook-up operation has not yet been carried out, then either a copy operation (if there is an original) or a recording paper cutting operation (if there is not an original) proceeds. In the presence of the hook-up operation, if there is an original a transmission operation starts, while if there is not an original a reception operation starts. In the case that an original has been set and the main power supply is turned on by the hook-up operation, a preparatory five second illumination for the fluorescent lamp 26 starts at once and thereafter a principal illumination is carried out. Simultaneously therewith, the tip of an original is fed to the reading out position P.

During one minute after the power supply circuit 18 is turned on, the manipulation of the start button is kept enabled, while after the lapse of one minute, the power supply circuit 18 is turned off to return to the original waiting condition.

Furthermore, the control circuit 30 controls every not shown parts of the transmit/receive system similarly in the known manner to thereby perform picture image transmission and reception, copy operation, recording operation and the like.

Figures 1, 3A:
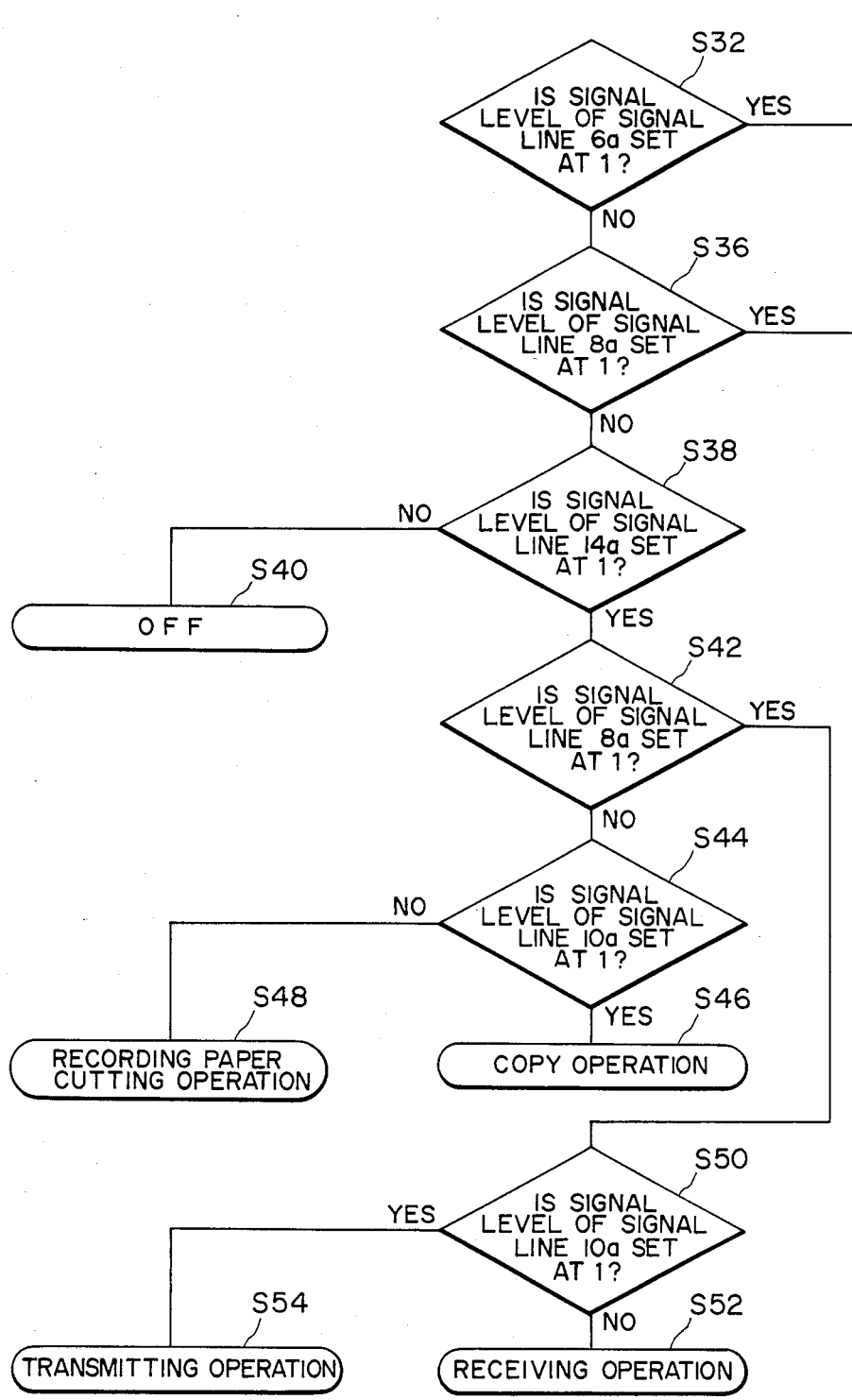
FIGS. 3A, consisting of FIGS. 3A-1 and 3A-2, and 3B, consisting of FIGS. 3B-1 and 3B2, are respectively flow charts for illustrating the control processes of the control circuit of FIG. 1.
Figures 2, 3A:
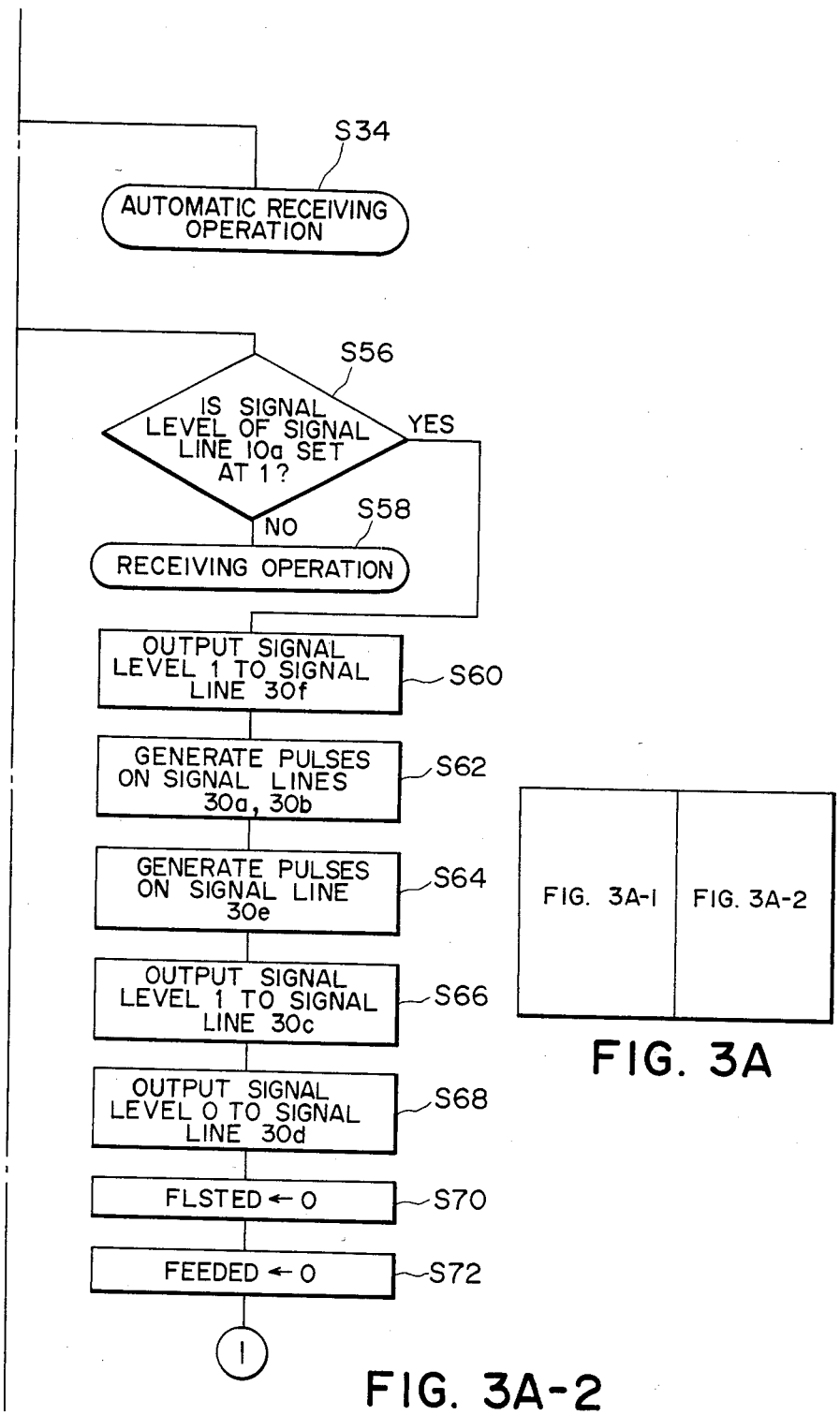
FIG. 2 is a cross sectional view of the main part of a read-out device.
Figures 1, 3B:
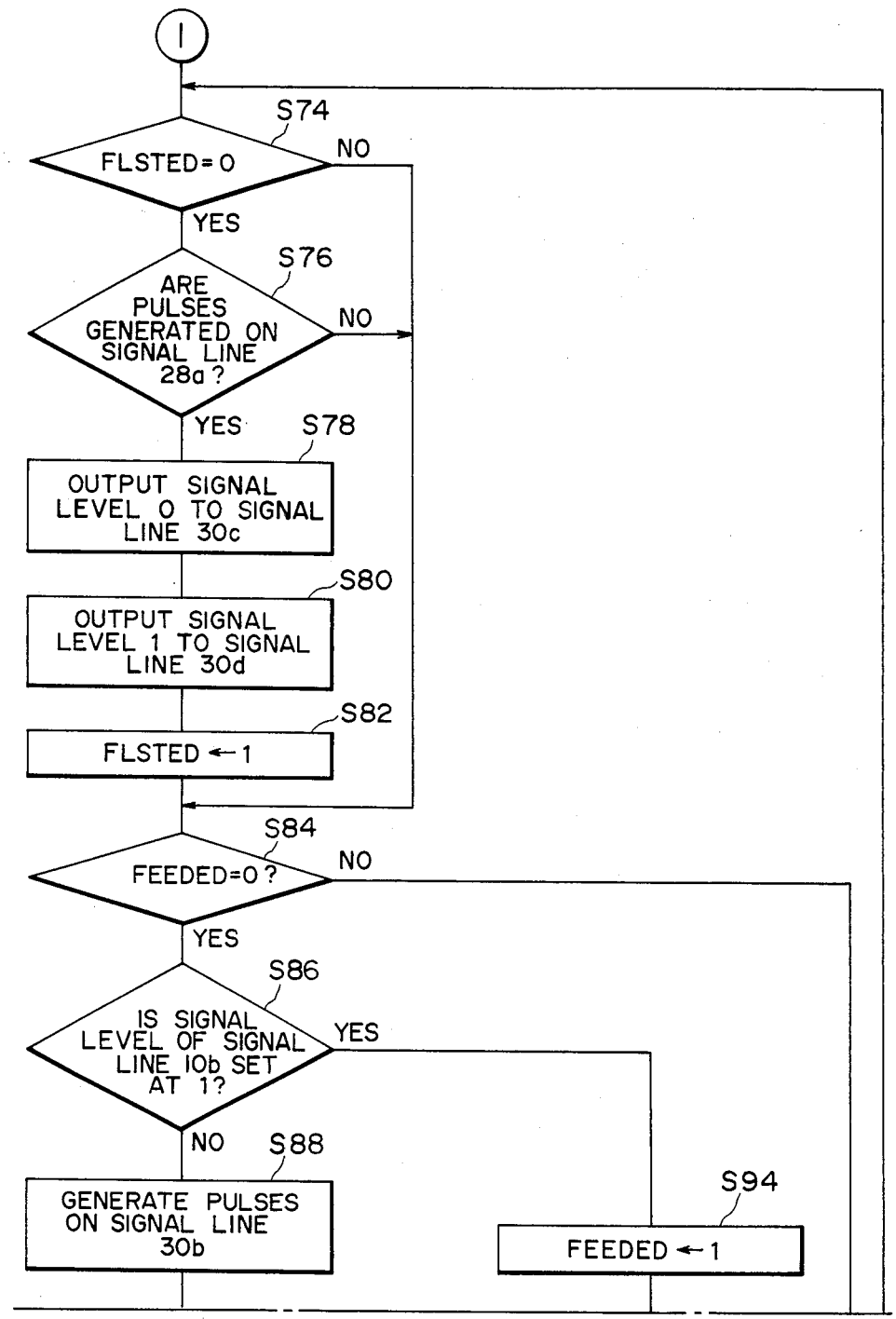
Figures 1, 2, 3B:
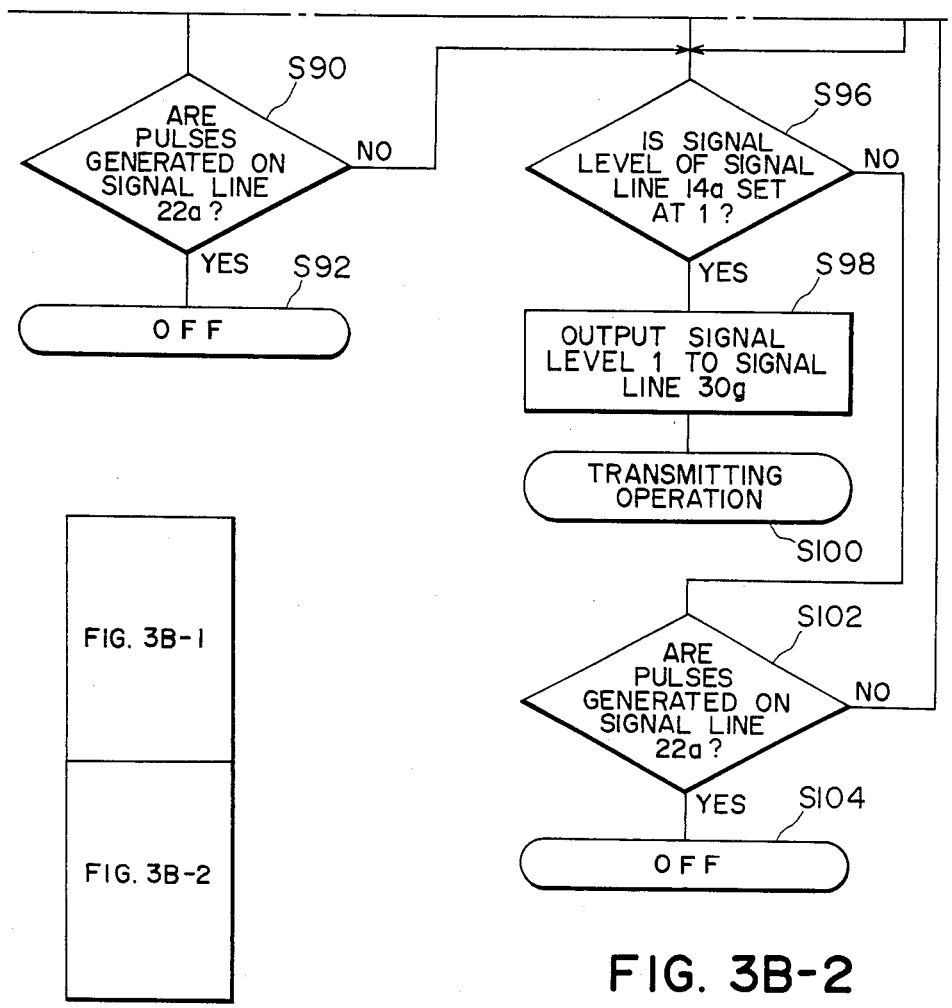

FIGS. 3A and 3B are flow charts chowing in detail the protocol of the control circuit 30 after the power supply circuit 18 is turned on. In FIGS. 3A and 3B, the positions represented by the same number are coupled to combine the two flow charts.

At step S32 in FIG. 3A, whether the level of the signal line 6a is "1", that is, whether automatic reception has been performed, or not is judged. In the case of automatic reception, step S34 follows to perform a known automatic reception control.

At step S36, whether the level of the signal line 8a is "1", that is, whether the telephone has been hooked up which is detected by the output from the hook-up detection circuit 8, or not is judged. In the case of a hook-up condition, step S56 follows, and if not step S38 follows.

At step S38, whether the level of the signal line 14a is "1", that is, whether the start button has been manipulated, or not is judged. In the cse of a start button depression condition, step S42 follows, and if not step S40 follows.

At step S40, the power supply circuit 18 is turned off under control of the signal line 30f or other not shown lines. Steps represented by (OFF) in the flow charts operate the same function as step S40.

At step S42, the off-hook condition is checked as in step S36. In the case of an off-hook condition, step S50 follows, and if not, step S44 follows.

At step S44, the output from the original detection circuit 10 is checked. In particular, whether the level of the signal line 10a is "1", that is, whether the original is at the position front of the reading out position and remote by a preset distance, or not is judged. If the step is affirmative, step S46 follows, and if negative, step S48 follows.

At step S46, since the telephone is not hooked up and an original is not set, a known copy operation is performed. In the case that the telephone is not hooked up and an original is not set, in step S48 the recording paper is cut with the cutter 29.

At step S50, whether the level of the signal line 10a is "1", that is, whether the original is at the position front of the reading out position and remote by a preset distance, or not is judged. If the step is affirmative, since the telephone has been taken off the hook and the original has been set, a known transmission operation is performed at step S54. On the other hand, if negative, since an original is not set, a reception operation is performed at step S52.

At step S56, the original is detected at the position front of the reading out position and remote by the preset distance. If there is no original, a reception operation is performed at step S58.

If there is an original, a level "1" is output onto the signal line 30f at step S60. As a result, the output of the OR circuit 16 becomes a level "1" to retain an ON state of the power supply circuit 18.

Next, at steps S62 and S64, pulses are generated onto the signal lines 30a, 30b and 30e so that the timer circuits 22 and 28 start and the original is fed to the reading out position.

Succeedingly, at steps S66 and S68, levels "1" and "0" are output respectively onto the signal lines 30c and 30d to perform a preparatory illumination of the fluorescent lamp 26. In particular, in the case that there is an original and the telephone has been hooked up, the preparatory illumination is performed so as to perform a transmission operation immediately after necessary processings.

At step S70, the control circuit 30 stores "0" into a predetermined memory region. The memory region is hereinafter labelled as FLSTED. The FLSTED region is used for indicating the termination of the preparatory illumination. The FLSTED region is set at "1" at the time when the preparatory illumination terminates.

At the following step S72, a similar memory region FEEDED is set at "0". The FEEDED reigon is set at "1" at the time when the original is fed to the original reading out position.

Next, at step S74 in FIG. 3B, whether the FLSTED region is "0" or not is judged. If the step is affirmative, then step S76 follows and if negative step S84 follows.

At step S76, whether pulses have been generated, that is, whether the five second counting starting at from step S66 has been completed, or not is checked. In particular, the termination of the five second preparatory illumination is checked. If the step is affirmative, then step S78 follows, and if negative step S84 follows.

At steps S78 and S80, levels "0" and "1" are output respectively onto the signal lines 30c and 30d. That is, the principal illumination of the fluorescent lamp 26 is performed.

At step S82, since the preparatory illumination has been completed, the FLSTED region is set at "1".

At step S84, whether the FEEDED region is "0" or not is judged. In particular, whether the original is under the feed operation or not is checked. In the case under the feed operation, step S86 follows, and in the case that the feed operation of the original has been completed, step S96 follows.

At step S86, whether the level of the signal line 10b is "1", that is, after completion of the original feeding to the reading out position whether the original detection circuit 10 has detected the original at the reading out position, or not is checked. In the case of the feed completion, step S94 follows, and the FEEDED region is set at "1". If the feeding is not still completed, at step S88, pulses are generated onto the signal line 30b to drive the feed circuit 24 into operation (or to continue the feeding operation).

At step S90, whether pulses have been generated onto the signal line 22a, that is, whether the one minute counting of the timer circuit 22 has been terminated, or not is checked. If the step is affirmative, the OFF state is brought about at step S92, while if negative, step S96 follows.

As described above, at step S36 the hook-up condition of the telephone 9 is detected and at step S56 the setting of an original is detected. Then, the five second preparatory illumination of the light source and the feeding of the original to the original reading out position are carried out. During such period, the operator can call the receiver using the telephone. Therefore, immediately after the start button is depressed and the preceding processes finish, the reading out of the original and its transference can start.

At step S96, whether the level of the signal line 14a is "1", that is, whether the start button has been manipulated, or not is checked. If the start button is manipulated, step S98 follows, while if the start button is not manipulated, step S102 follows. At step S98, a level "1" is delivered to the signal line 30g to connect the transmit/receive system of the facsimile apparatus and the telephone line 2a by the CML circuit 2. Thereafter, at step 100, a transmission operation including the preceding processes is carried out.

At step S102, whether pulses have been generated onto the signal line 22a, that is, whether the one minute counting of the timer circuit 22 has been completed, or not is judged. If one minute has elapsed after the start of the counting by the timer circuit 22, the OFF state begins at step S104, and if not, the process returns to step S74 to repeat the above operations.

As seen from the above description of the embodiment, various controls can be effected basing upon the presence or absence of an off-hook condition of the telephone and the original.

If the off-hook operation is performed while the original is set, the preparatory illumination of the light source and the feeding of the original to the reading out position are immediately carried out, so that the transmission of a picture image can start just after the completion of the preceding processes. Thus, the time after setting the network can be shortened and communication speed cn be improved.

If on the other hand the start button is depressed without the off-hook of the telephone and the setting of an original, the cutting operation for a recording paper starts. If the start button is depressed with the setting of an original, the copy operation starts.

Furthermore, if the start button is depressed without the setting of an original and with off-hook, then the reception operations starts.

As appreciated, the aboveembodiment can have various operational modes by adding as control conditions the presence or absence of off-hook and an original. Therefore, at least a copy button and a cutting button for a recording paper provided with a conventional apparatus can be dispensed with, resulting in a remarkable simplification of manipulation and a lower cost of the apparatus.

Although the example of a manual communication has been described above, also in automatic communication, various operational modes can be selected basing upon the conditions of the presence or absence of off-hook and an original in a similar manner as above. The preparatory operations for a picture image transference have been exemplarily described using the above preparatory illumination of the light source and the feeding of an original, however, other operations instead can also be applied.

The present invention is not limited to the above embodiment, but various applications and modifications may be made which fall within the scope of the appended claims.

What is claimed is:

1. A picture image communication apparatus comprising:
original detection means for detecting a setting of an original;
a manual switch for commanding the start of reading out of a picture image of the original;
feed means for feeding the original to a reading out position;
control means for driving said feed means based upon a detection output from said original detecting means without waiting for a turning on of said manual switch;
timer means for counting a time until said manual switch is turned on;
set means for setting said apparatus to a standby state when said manual switch is not turned on for a predetermined time;
a telephone; and
off-hook detection means for detecting an off-hook state of said telephone;
wherein said control means drives said feed means based upon outputs from said off-hook detection means and said original detection means without waiting for said manual switch to be turned on 2. A picture image communication apparatus according to claim 1, wherein said apparatus is adapted to perform a transmission operation and said control means causes said transmission operation to start after said manual switch is turned on.

3. A picture image communication apparatus comprising:
original detection means for detecting a setting of an original;
a manual switch for commanding the start of transmission of a picture image of the original;
illumination means for illuminating the original so as to read out the picture image of the original;
control means for turning on said illumination means based upon a detection output from said original detection means without waiting for said manual switch to be turned on;
timer means for counting a time until said manual switch is turned on;
set means for setting said apparatus to a standby state when said manual switch is not turned on for a predetermined time;
a telephone; and
off-hook detection means for detecting an off-hook state of said telephone;
wherein said control means turns on said illumination means based upon outputs from said off-hook detection means and said original detection means without waiting for said manual switch to be turned on.

4. A picture image communication apparatus according to claim 1, in which said set means turns off a power supply if said manual switch is not turned on within said predetermined time.

5. A picture image communication apparatus according to claim 3, in which said control means makes a transmission operation start after said manual switch is turned on.

6. A picture image communication apparatus according to claim 3, in which said set means turns off a power supply if said manual switch is not turned on within said predetermined time.

7. A picture image communication apparatus according to claim 1, wherein said feed means stops the original at said reading out position and again starts the feeding of the original after said manual switch is turned on.

8. A picture image communication apparatus comprising:
original detection means for detecting a setting of an original;
a manual switch for commanding the start of transmission of a picture image of the original;
illumination means for illuminating the original so as to read out the picture image of the original;
a telephone;
off-hook detection means for detecting an off-hook state of said telephone; and
control means for turning on said illumination means based upon outputs from said off-hook detection means and said original detection means without waiting for said manual switch to be turned on.

9. A picture image communication apparatus comprising:
 original detection means for detecting a setting of an original;
 a manual switch for commanding the start of reading out of a picture image of the original;
 feed means for feeding the original to a reading out position;
 a telephone;
 off-hook detection means for detecting an off-hook state of said telephone; and
 control means for driving said feed means based upon outputs from said off-hook detection means and said original detection means without waiting for said manual switch to be turned on.

* * * * *

UNITED STATES PATENT AND TRADEMARK OFFICE
CERTIFICATE OF CORRECTION

PATENT NO. : 4,727,576
DATED : February 23, 1988
INVENTOR(S) : TAKEHIRO YOSHIDA

It is certified that error appears in the above-identified patent and that said Letters Patent is hereby corrected as shown below:

AT [57] IN THE ABSTRACT

Line 3, "nial;" should read --inal;--.

COLUMN 1

Line 40, "cn" should read --can--.
    Line 56, "outout" should read --output--.
    Line 56, "withoout" should read --without--.

COLUMN 3

Line 49, "throough" should read --through--.
    Line 64, "wit" should read --with--.

COLUMN 4

Line 63, "parts" should read --part--.
    Line 63, "system" should read --system 4--.
    Line 67, "chowing" should read --showing--.

COLUMN 5

Line 17, "cse" should read --case--.

COLUMN 6

Line 12, "affiramtive," should read --affirmative,--.

UNITED STATES PATENT AND TRADEMARK OFFICE
CERTIFICATE OF CORRECTION

PATENT NO. : 4,727,576

DATED : February 23, 1988

INVENTOR(S) : TAKEHIRO YOSHIDA

It is certified that error appears in the above-identified patent and that said Letters Patent is hereby corrected as shown below:

COLUMN 7

```
Line 9, "basing" should read --based--.
Line 19, "cn" should read --can--.
Line 27, "operations" should read --operation--.
Line 28, "aboveembodiment" should read --above embodiment--.
Lines 38-39, "basing" should read --based--.
```

Signed and Sealed this

Twelfth Day of July, 1988

Attest:

DONALD J. QUIGG

Attesting Officer

Commissioner of Patents and Trademarks